United States Patent
Nebel et al.

(10) Patent No.: US 11,333,544 B2
(45) Date of Patent: May 17, 2022

(54) APPARATUS FOR SIMULTANEOUSLY DETERMINING WEIGHTS OF COMPOSITE SHEETS

(71) Applicant: HONEYWELL INTERNATIONAL INC., Morris Plains, NJ (US)

(72) Inventors: Tobias Nebel, North Vancouver (CA); Gertjan Hofman, Vancouver (CA); Michael Kon Yew Hughes, Vancouver (CA); Sebastien Tixier, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 69 days.

(21) Appl. No.: 16/443,543

(22) Filed: Jun. 17, 2019

(65) Prior Publication Data

US 2020/0393286 A1    Dec. 17, 2020

(51) Int. Cl.
*G01G 17/02* (2006.01)
*G01G 9/00* (2006.01)

(52) U.S. Cl.
CPC ............ *G01G 17/02* (2013.01); *G01G 9/005* (2013.01)

(58) Field of Classification Search
CPC ...... G01G 9/005; G01G 17/02; G01N 23/083; G01N 23/16
See application file for complete search history.

(56) References Cited

U.S. PATENT DOCUMENTS

| | | | | |
|---|---|---|---|---|
| 3,757,122 A | * | 9/1973 | Bossen | ................... G01N 23/16 250/358.1 |
| 3,889,121 A | * | 6/1975 | Bossen | ................ G01N 23/083 250/359.1 |

(Continued)

FOREIGN PATENT DOCUMENTS

| | | |
|---|---|---|
| CN | 101346625 A | 1/2009 |
| CN | 102768063 A | 11/2012 |

(Continued)

OTHER PUBLICATIONS

Office Action for corresponding Japanese Application No. 2020-101506.

(Continued)

*Primary Examiner* — Natalie Huls
(74) *Attorney, Agent, or Firm* — John Maldjian; Stevens & Lee PC

(57) ABSTRACT

A measurement apparatus includes a beta gauge for generating a first sensor response signal from a composite sheet including a sheet material having a coating thereon including a high-z material or the sheet material has particles including the high-z material embedded in the sheet material. A second sensor being an x-ray or an infrared (IR) sensor provides a second sensor response signal from the composite sheet. A computing device is coupled to receive the first and the second sensor response signal that includes a processor having an associated memory for implementing an algorithm that uses the first and the second sensor response signal to simultaneously compute two or more (Continued)

weight measures selected from (i) a weight per unit area of the high-z material, (ii) a weight per unit area of the sheet material, and (iii) a total weight per unit area of the composite sheet.

10 Claims, 2 Drawing Sheets

(56) References Cited

U.S. PATENT DOCUMENTS

| | | | | |
|---|---|---|---|---|
| 4,692,616 | A * | 9/1987 | Hegland | G01D 18/00 250/252.1 |
| 4,845,730 | A | 7/1989 | Mercer | |
| 4,920,265 | A * | 4/1990 | Chase | G01N 23/16 850/63 |
| 5,077,478 | A * | 12/1991 | Walford | G01N 23/203 250/359.1 |
| 5,576,541 | A * | 11/1996 | Bickert | G01B 15/025 850/63 |
| 5,795,394 | A * | 8/1998 | Belotserkovsky | B05C 1/0869 118/413 |
| 6,312,523 | B1 * | 11/2001 | Caldwell | A61F 13/15772 118/123 |
| 7,399,971 | B2 * | 7/2008 | Hofman | G01N 23/083 250/358.1 |
| 8,394,449 | B2 * | 3/2013 | Meijer Drees | G01B 15/025 427/8 |
| 9,612,213 | B2 * | 4/2017 | Meijer Drees | G01N 23/16 |
| 10,876,882 | B1 * | 12/2020 | Nebel | G01B 11/0691 |
| 2002/0168046 | A1 * | 11/2002 | Hansen | G01N 33/02 378/51 |
| 2007/0014528 | A1 | 1/2007 | Busse et al. | |

FOREIGN PATENT DOCUMENTS

| | | |
|---|---|---|
| JP | H04506572 A | 11/1992 |
| WO | 2002003487 A1 | 1/2002 |

OTHER PUBLICATIONS

Notice of Reasons for Refusal dated May 7, 2021; issued in connection with correspondnig Japanese Patent Application No. 2020-101506 with English language translation (6 pages total).

Decision of Refusal dated Nov. 26, 2021; issued in connection with corresponding Japanese Patent Application No. 2020-101506 with English language translation (6 pages total).

Office Action and Search Report dated Aug. 16, 2021; issued in connection with corresponding Chinese Patent Application No. 202010539745.0 (9 pages total).

Second Office Action dated Feb. 16, 2022; issued in connection with corresponding Chinese Patent Application No. 202010539745.0 (14 pages total).

* cited by examiner

APPARATUS FOR SIMULTANEOUSLY DETERMINING WEIGHTS OF COMPOSITE SHEETS

FIELD

Disclosed embodiments relate to apparatus for measuring the weight of coated sheet material.

BACKGROUND

Ceramic-coated polyethylene (PE) or polypropylene (PP) separator membranes are important components for the performance of lithium-ion batteries (LiBs). The separator-membrane provides an ion-permeable barrier between the cathode and the anode. These membranes are porous and if uncoated generally start to degrade at temperatures of around 120° C. causing the LiB to short-circuit and thus fail. A ceramic coating (e.g. $Al_2O_3$) applied on the membrane is known to help to improve the separator's temperature-stability to up to about 200° C. At high temperatures, the coated separators become impermeable which precludes their operation, but this also prevents thermal runaway events.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize industries such as the LiB industry need a cost-effective solution to simultaneously determine the high-z material weight and the weight of the separator membrane so that these parameters can be independently controlled. Disclosed aspects include a measurement apparatus for simultaneously determining two or more weight measures comprising (i) a weight per unit area of the high-z material which can be in the form of a coating on a sheet material and/or the high-z particles embedded in the sheet material, (ii) a weight per unit area of the sheet material, and (iii) a total weight per unit area of the composite sheet. One particular arrangement is a LiB separator membrane which has a high-z coating thereon.

Disclosed aspects include a measurement apparatus that includes a beta gauge for generating a first sensor response signal from a composite sheet including a sheet material having a coating thereon including a high-z material or the sheet material has particles including the high-z material embedded in the sheet material. A second sensor comprising an x-ray sensor or an infrared (IR) sensor is for providing a second sensor response signal from the composite sheet material. A computing device is coupled to receive the first and the second sensor response signal that includes a processor having an associated memory for implementing an algorithm which uses the first sensor response signal and the second sensor response signal to simultaneously compute two or more weight measures. The weight measures are selected from (i) a weight per unit area of the high-z material, (ii) a weight per unit area of the sheet material, and (iii) a total weight per unit area of the composite sheet.

DETAILED DESCRIPTION

Figure 1:
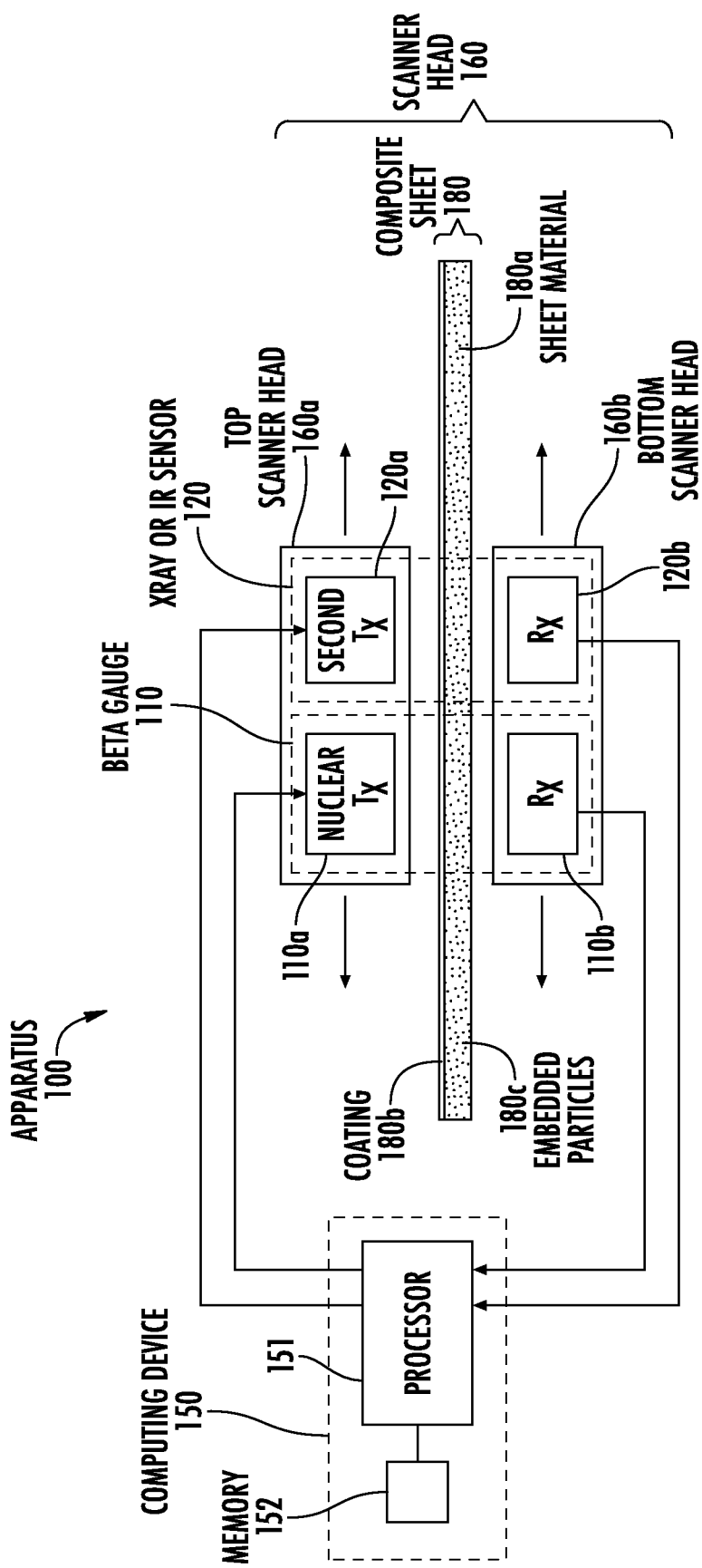
FIG. 1 is depiction of an example measurement apparatus for simultaneously determining two or more weight measures comprising (i) a weight per unit area of high-z material, (ii) a weight per unit area of the sheet material, and (iii) a total weight per unit area of the composite sheet.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Disclosed measurement apparatus comprise two sensors including a beta gauge and a second sensor comprising a transmission x-ray or a transmission or reflection-based IR sensor used to simultaneously measure two or more weight measures. The weight measures are selected from (i) a weight per unit area of the high-z material, (ii) a weight per unit area of the sheet material, and (iii) a total weight per unit area of the composite sheet. FIG. 1 is depiction of an example disclosed measurement apparatus 100, where the composite sheet shown as 180 is shown comprising a coating 180b including a high-z material on a sheet material 180a and the high-z material is also shown as embedded particles 180c in the sheet material 180a. The sheet material 180a can comprise a porous sheet material, defined by a porosity being a percentage of void space divided by the total volume of the sheet material that is at least 5%, where the porosity of the sheet material is typically 40% to 70%.

The measurement apparatus 100 is configured to simultaneously measure a plurality of weights for the composite sheet 180. As noted above these weights are (i) the weight per unit area of the high-z material, (ii) the weight per unit area of the sheet material, and (iii) the total weight per unit area of the composite sheet 180. The high-z material in the coating 180b is defined herein to have at least one atomic species with an atomic number at least that of aluminum which has an atomic number of 13. A scanner head 160 comprises a top scanning head 160a and a bottom scanning head 160b, that has two sensors therein, one of them a beta gauge 110 and a second sensor 120 that comprises an X-ray sensor or an IR sensor. The scanner head 160 is used to scan the sensors 110, 120 over the composite sheet 180 after the coating 180b has been applied to the sheet material 180a. A beta gauge 110 provides an almost composition-insensitive measurement for the total weight of the composite sheet 180 which is generally a flat (planar) sheet.

A beta gauge as known in the art is a device for measuring the thickness or weight of a material based on the material's absorption of beta rays which are fast-moving electrons emitted by the radioactive decay of certain radioactive materials. A beta gauge includes a source of beta radiation such as Kr-85, Sr-90, Pm-147, and being a transmission-based sensor has a radiation detector (or receiver) positioned opposite the beta source, that can measure the thickness or weight of various materials, such as plastics, paper, and metal and associated composite materials.

The second sensor 120 extracts information used for determining the weight of the coating 180b and/or the embedded particles 180c in the sheet material. In the case the second sensor 120 comprises an x-ray sensor, the x-ray sensor is for measuring transmitted x-rays, where the x-ray absorption is proportional to the atomic number (Z) and is therefore most sensitive to high-z materials. This second sensor 120 measurement provides a measurement which is most sensitive to the weight of the coating 180b, which can be a ceramic coating. Specifically, in the case of an x-ray sensor, the x-ray measurement is generally about 10 times more sensitive to the coating 180b weight than to the weight of the sheet material 180a which for a LiB is generally a plastic membrane.

Figure 2:
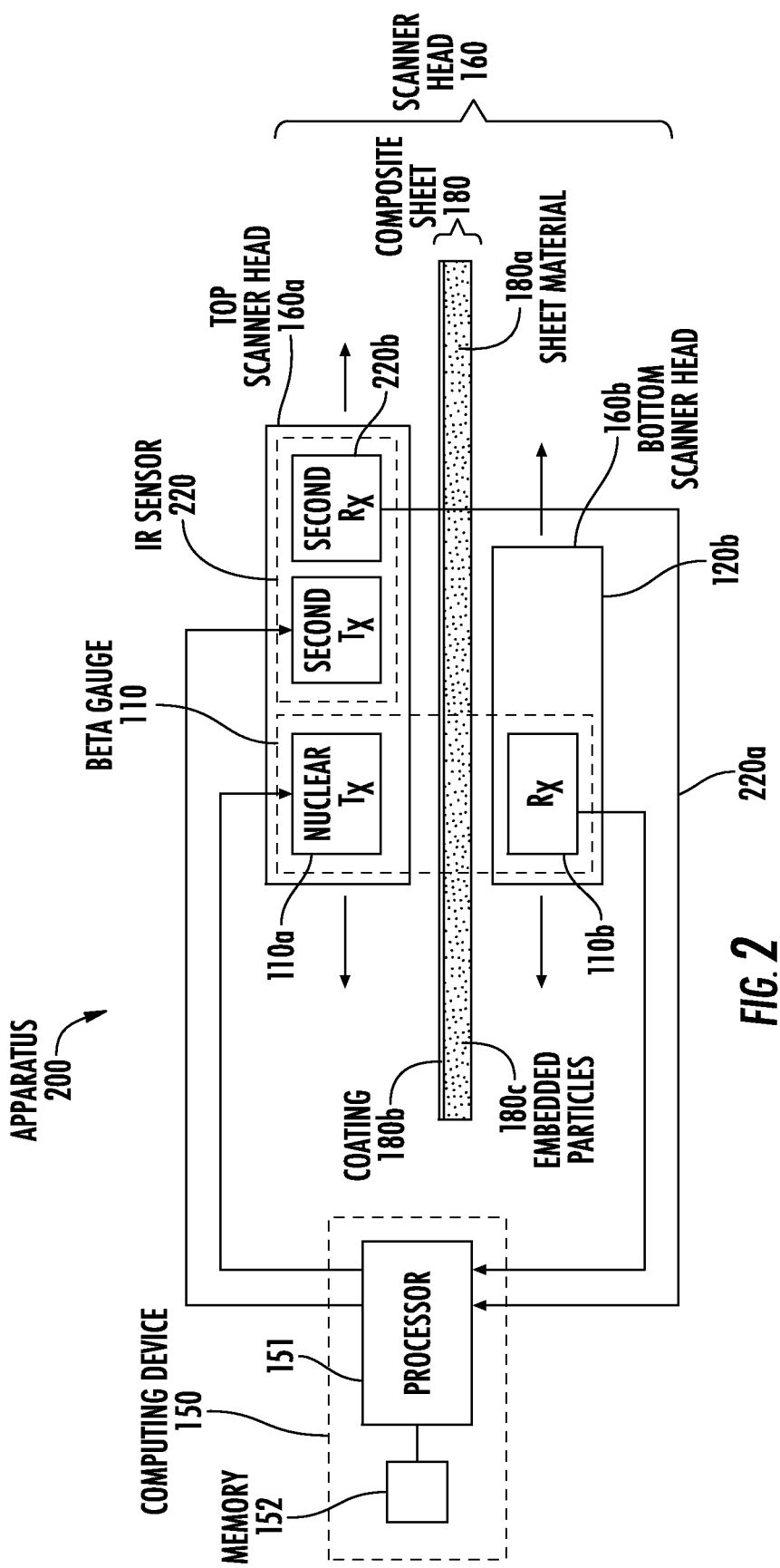
FIG. 2 is depiction of another example measurement apparatus for simultaneously determining two or more weight measures comprising (i) a weight per unit area of the high-z material, (ii) a weight per unit area of the sheet material, and (iii) a total weight per unit area of the composite sheet.

As noted above, the second sensor 120 can also be an IR sensor that can comprise a transmission-based sensor shown in FIG. 1 or reflection-based as shown in FIG. 2. Spectral filters inside the IR sensor can be selected such that they cover absorption bands of the sheet material 180a. This way, the IR sensor is most sensitive to the sheet material 180a weight (also known as the base-layer weight).

The second sensor 120 which can as noted above be an X-ray sensor or an IR sensor are both shown as a transmission sensors and therefore have upper and lower halves, shown as transmitter (Tx) 120a and receiver (Rx) 120b, respectively. The IR sensor can alternatively be a reflection sensor as shown in FIG. 2, but the x-ray sensor is always generally a transmission sensor.

The composite sheet 180 can comprise a high-z material coating 180b on a flat polymer sheet, and the high-z material can also be provided as embedded particles 180c in the sheet material 180a. The high-z material particles can be a ceramic such as an $Al_2O_3$, $SiO_2$, or $ZrO_2$. A coating comprising the high-z material-(although the ceramic particles not themselves porous) when a component of a coating can be porous again, where a coating having high-z material particle's is defined herein as having a percentage of void space divided by the total volume of the coating of at least 5% having an open pore structure such that ions can flow through the thickness of the coating and the underlying substrate (e.g., membrane).

The sheet material 180a can comprise a polymer or layers of polymers (e.g., polyethylene (PE), polypropylene (PP)). The coating 180b is generally not solely comprised of high-z ceramic particles; but also generally includes binder materials. These binder materials may have a cross-sensitivity to the secondary sensor measurement technique (i.e., for IR sensors they may have some overlapping IR signature for instance). The effects of these cross sensitivities should generally be taken into account when computing the respective weights per unit area. While currently ceramic particles (embedded in binders) are applied as either single-sided or double-sided coatings, as noted above this Disclosure also includes weight measurements for coated sheet materials that have inclusion of ceramic particles as embedded particles 180c within the sheet material 180a itself.

The beta gauge is generally calibrated to measure the total weight of the composite sheet 180. Due to sensitivity to the sheet material 180a, the X-ray gauge is generally not calibrated to independently measure the coating 180b. Similarly, due to sensitivity to binder and to the presence of the coating 180b, the IR gauge is generally not calibrated to independently measure the sheet material 180a. The X-ray gauge signal is generally combined with the beta gauge signal using a multi-dimension algorithm to provide an accurate measure of the coating 180b. Similarly, the IR gauge signal is combined with the beta gauge signal to provide an accurate measure of the sheet material weight 180a.

Using samples of different sheet material 180a weight and high-z coating material weight 180b combinations, a data set of input lab-weights and output sensor signals can be recorded. A statistical or machine learning algorithm can then be utilized to fit a calibration function with multiple inputs to two outputs. This algorithm can include partial least squares regression, multi-variate linear regression, principal component analysis (PCA), or other appropriate techniques and their related derived techniques. Accordingly, the whole disclosed weight measurement can be calibrated by performing a two-predictor (nuclear and x-ray or IR) partial least square regression (or similar statistical method) on a set of customer samples with known component weights.

In some circumstances, the calibration of the sensors 110, 120 can happen independently. For example, where the x-ray sensor is the second sensor 120 it can be calibrated for the high-z material weight or when the second sensor 120 comprises an IR sensor it can be calibrated for the sheet material (e.g., PE) weight. The beta gauge 110 can be calibrated for total weight of the composite sheet 180.

The IR measurement can use existing technology (up to a wavelength of about 7 microns) to examine certain spectral regions characteristic to plastic separator membranes by applying spectral filters to an IR signal. One or more spectral filters (at about 3.4 and/or 6.7 microns for PE) cover usually very distinct plastic absorption peaks. One or more spectral filters cover reference regions in the close vicinity of the absorption peaks. A background-free absorption signal can be calculated from these. This IR signal can be used in combination with the beta gauge signal to determine the weight per unit area of the sheet material 180a (e.g., a plastic sheet). The measurement apparatus 100 comprises the scanner head 160 shown in FIG. 1 including a top scanner head 160a and a bottom scanner head 160b for mounting the beta gauge 110 and the second sensor 120 comprising an x-ray sensor or IR sensor. Control of the position of the scanner head 160 is well-known. The scanner head 160 can scan over part of the width or the entire width of the composite sheet 180.

Inside the scanning heads 160a, 160b, the respective sensors 110, 120 are mounted along a line that can either be parallel to the machine direction (MD) or in a cross direction (CD). The scanner heads 160a, 160b can scan across the web to develop a representation of the composite sheet 180 which is moving between the scanning heads 160a, 160b. Signals from the RXs 110b, 120b as known in the art are processed by electronics (not shown) including a filter, an analog-to-digital converter (ADC), and an amplifier which is then conveyed to the computing device 150 including a processor 151 having an associated memory 152 shown in FIG. 1. Also not shown, there is generally electronics between the processor 151 and the TXs 110a, 120a that generally comprises at least a digital-to-analog converter (DAC).

The processor 151 takes the measurements received and calculates the high-z coating weight using an algorithm or digital logic. It is noted that some of this processing can take place within the sensors themselves. There can be other inputs to the processor 151, such as the head position of the scanning heads 160a, 160b, or the machine direction position.

An X-ray sensor (e.g., 4 kV to 5 kV) provides a measurement which, due to higher density and higher atomic numbers, is about 10 times more sensitive to the coating material weight than to weight of the sheet material 180a in the case of a LiB generally being a plastic membrane. Alternatively, when the second sensor comprises an IR sensor, the IR sensor will provide a measurement which is mostly sensitive to the sheet material 180a weight (e.g. comprising PE) and is generally insensitive to the weight of the coating material. The disclosed combination of a beta gauge and x-ray or IR measurements enables determining the coating material 180b weight, the weight of the sheet material 180a, and the total weight of the composite sheet 180 side by side on a single measurement apparatus 100.

One of ordinary skill in the art will appreciate and understand that the disclosed area weight measurements can be translated into thickness measurements as long as one measures or assumes a material concentration, or at least a relative concentration of the composite materials. If one assumes or measures a sheet or layer thickness one could also derive material concentrations.

FIG. 2 is a depiction of another example measurement apparatus 200 for simultaneously determining the coating or embedded particle weight and the weight of a sheet material itself, including a beta gauge 110 and an IR sensor 220 configured as a reflection-based sensor, according to an example embodiment. In this arrangement, the IR sensor 220 includes a transmitter 220a and a receiver 220b both located in the top scanning head 160a.

The combination of a beta gauge 110 such as a beta gauge with another sensor comprising an x-ray or IR sensor enables a single-scanner solution. For customers, disclosed arrangements will be generally cost effective, such as for weight measurements during LiB production. This Disclosure also applies to other industries producing flat sheet material (low atomic numbers with a ceramic containing coating and/or other high-z additives (e.g., metallic oxide coatings and metallic additives).

Disclosed embodiments can be applied to generally determine the weight of any coating material on a sheet material, for example a ceramic coating in or on a polymer substrate. As noted above both the coating material and the sheet material can be porous. The sheet material can comprise multiple layers of different polymers, for example PE/PP/PE, PP/PE/PP, PE/PP/PE/PP/PE. Applied to a sheet material having pores, as noted above the high-z material can be partially or completely embedded in the pores of the sheet material. For example, the high-z material can be embedded as inclusions in the pores of a porous sheet material film with some of the high-z material included in pores of the sheet material and some of the high-z material included provided as a coating on top of the sheet material. Alternatively, all of the high-z material (e.g., ceramic material) can be in the pores of the sheet material, and thus there not being a coating.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
   determining a first sensor response signal using a beta gauge from a composite sheet configured for a lithium ion battery (LiB) including a separator membrane comprising a sheet material comprising a polymer including a coating thereon comprising a high-z material or the sheet material has particles comprising the high-z material embedded in the sheet material;
   determining a second sensor response signal from the composite sheet using a second sensor comprising an x-ray sensor or an infrared (IR) sensor, and
   simultaneously computing from the first sensor response signal and the second sensor response signal two or more weight measures selected from (i) a weight per unit area of the high-z material, (ii) a weight per unit area of the sheet material, and (iii) a total weight per unit area of the composite sheet.

2. The method of claim 1, wherein the simultaneously computing comprises utilizing a calibration obtained by multidimensional least-squares fitting.

3. The method of claim 2, wherein the multidimensional least-squares fitting comprises partial least-squares regression (PLS).

4. The method of claim 1, wherein the simultaneously computing comprises utilizing a calibration obtained by principal component analysis (PCA) or a shallow neural network.

5. The method of claim 1, wherein the sheet material comprises a porous material and wherein the sheet material includes particles comprising the high-z material embedded therein.

6. The method of claim 1, wherein the weight measures include the (i) weight per unit area of the high-z material, the (ii) weight per unit area of the sheet material, and the (iii) total weight per unit area of the composite sheet.

7. A measurement apparatus, comprising:
   a beta gauge for generating a first sensor response signal from a composite sheet configured for a lithium ion battery (LiB) including a separator membrane comprising a sheet material comprising a polymer including a coating thereon containing a high-z material;
   a second sensor comprising an infrared (IR) sensor including at least one IR detector for providing at least one IR response signal from the composite sheet, and
   a computing device coupled to receive the first sensor response signal and the IR response signal including a processor having an associated memory for implementing an algorithm that uses the first sensor response signal and the IR response signal to simultaneously compute two or more weight measures comprising (i) a weight per unit area of the high-z material, (ii) a weight per unit area of the sheet material, and (iii) a total weight per unit area of the composite sheet.

8. The measurement apparatus of claim 7, wherein the weight measures include the (i) weight per unit area of the high-z material, the (ii) weight per unit area of the sheet material, and the (iii) total weight per unit area of the composite sheet.

9. The measurement apparatus of claim 7, wherein the sheet material includes particles comprising the high-z material embedded therein.

10. A measurement apparatus, comprising:
    a beta gauge for generating a first sensor response signal from a composite sheet configured for a lithium ion battery (LiB) that includes a separator membrane comprising a sheet material that comprises a polymer including a coating thereon containing a high-z material or the sheet material having particles comprising the high-z material embedded in the sheet material;

a second sensor comprising an x-ray sensor or an infrared (IR) sensor for providing a second sensor response signal from the composite sheet, and a computing device coupled to receive the first sensor response signal and the second sensor response signal including a processor having an associated memory for implementing an algorithm that uses the first sensor response signal and the second sensor response signal to simultaneously compute two or more weight measures comprising (i) a weight per unit area of the high-z material, (ii) a weight per unit area of the sheet material, and (iii) a total weight per unit area of the composite sheet.

* * * * *